(12) United States Patent
Togo

(10) Patent No.: US 6,843,294 B2
(45) Date of Patent: Jan. 18, 2005

(54) PNEUMATIC TIRE FOR AIRPLANE WITH REINFORCING LAYER HAVING TWO OR MORE JOINT PORTIONS IN THE CIRCUMFERENTIAL DIRECTION

(75) Inventor: Hiroyuki Togo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 232 days.

(21) Appl. No.: 09/948,538

(22) Filed: Sep. 10, 2001

(65) Prior Publication Data

US 2002/0056497 A1 May 16, 2002

(30) Foreign Application Priority Data

Sep. 11, 2000 (JP) ........................................ 2000-275232

(51) Int. Cl.[7] .............................. B60C 9/18; B60C 9/20; B60C 9/22
(52) U.S. Cl. ........................ 152/527; 152/526; 152/531; 152/533
(58) Field of Search ................................. 152/526, 527, 152/531, 533

(56) References Cited

U.S. PATENT DOCUMENTS

| | | | | |
|---|---|---|---|---|
| 3,802,982 A | * | 4/1974 | Alderfer | ................. 152/533 X |
| 4,219,601 A | * | 8/1980 | Inoue et al. | ............ 152/527 X |

* cited by examiner

Primary Examiner—Adrienne C. Johnstone
(74) Attorney, Agent, or Firm—Sughrue Mion, PLLC

(57) ABSTRACT

In a pneumatic tire for an airplane of the present invention, a reinforcing layer, which is disposed at an outer side, in the radial direction of the tire, of a belt, includes plural cords, the cords being provided such that the longitudinal direction thereof forms an angle of substantially 15° or less with respect to a tire circumferential direction. The reinforcing layer has two or more joint portions in the circumferential direction of the tire. In accordance with the present invention, a length of the cords forming the reinforcing layer in the tire circumferential direction can be made short, whereby a size (length) of tread pieces formed at a time when the tire is damaged can be made small and damage caused to an airplane can be reduced.

10 Claims, 4 Drawing Sheets

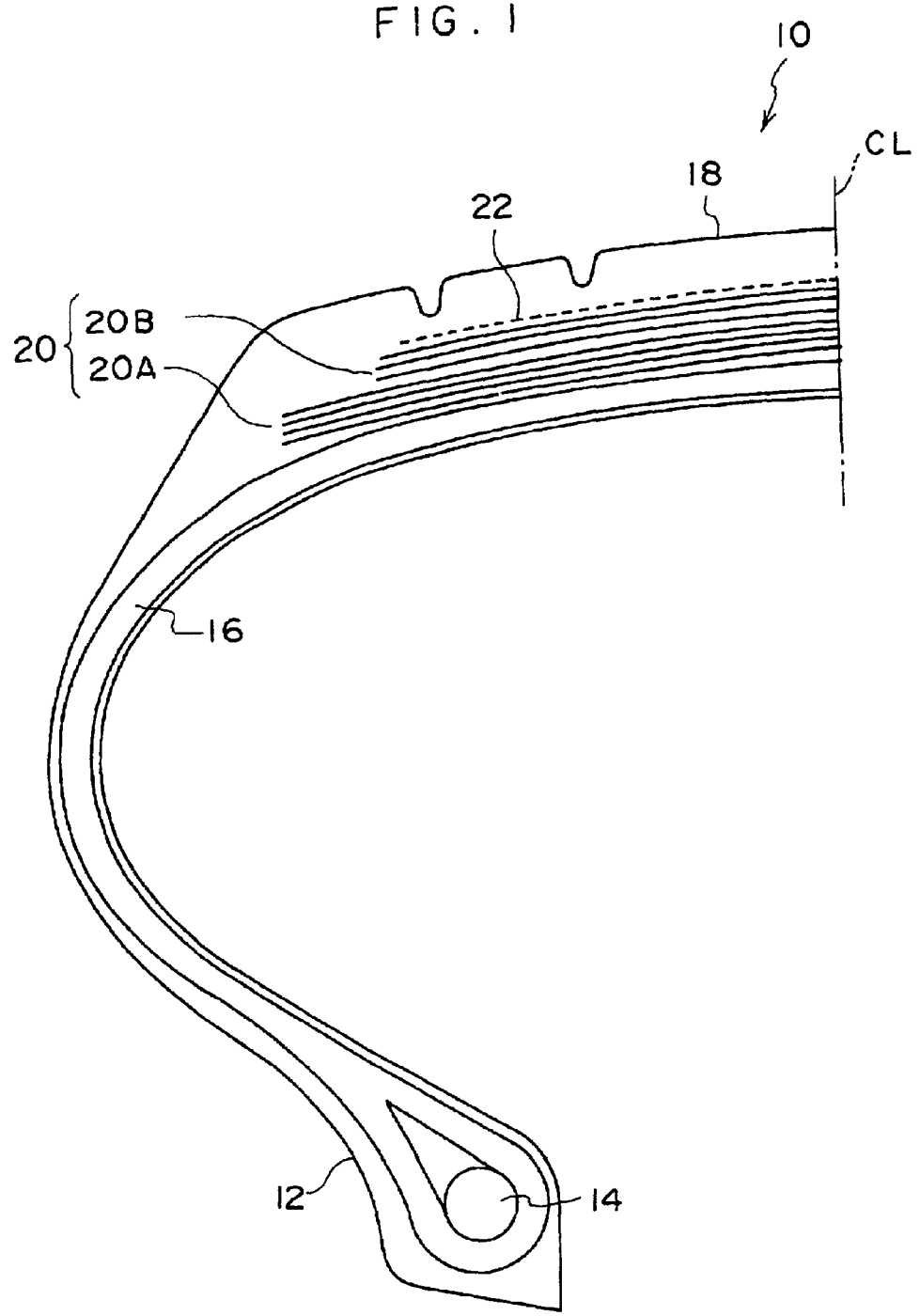

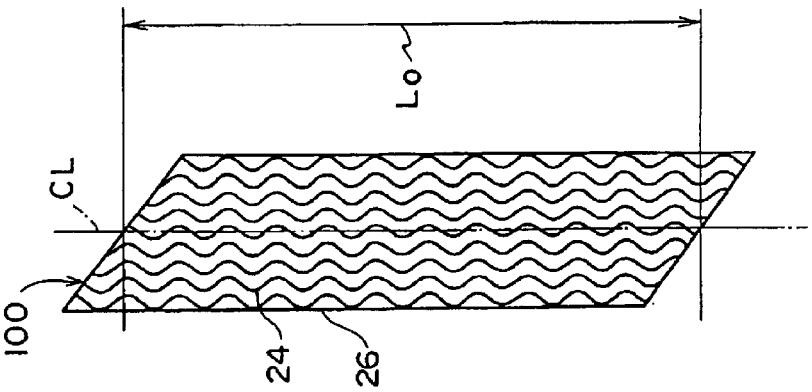
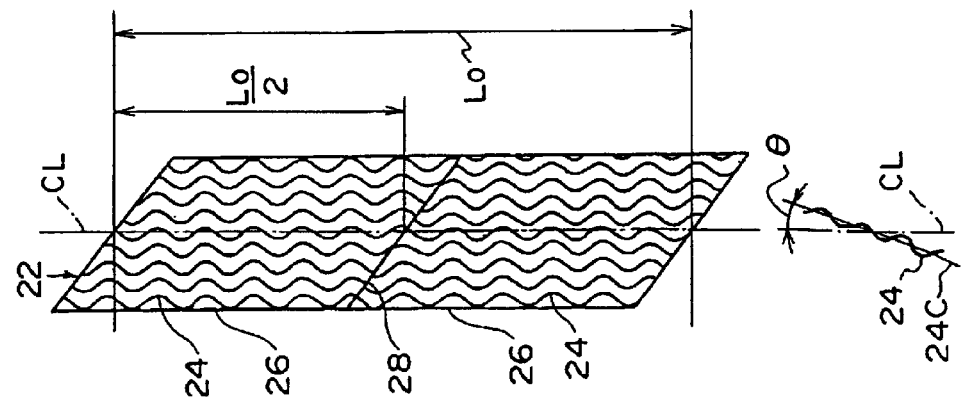

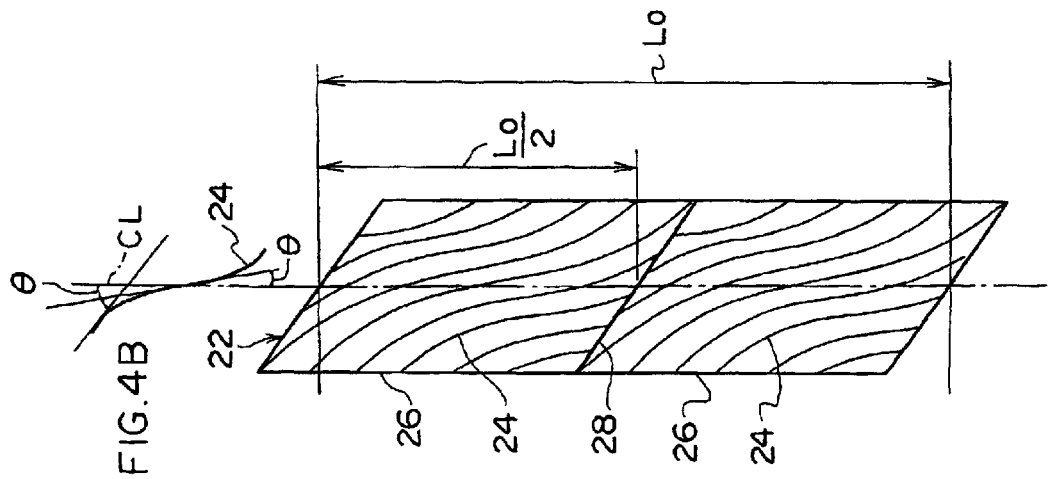
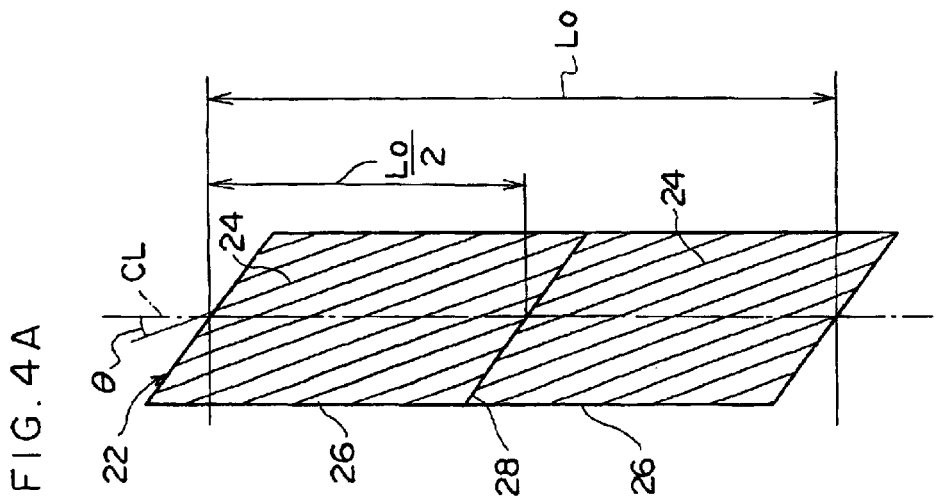

PNEUMATIC TIRE FOR AIRPLANE WITH REINFORCING LAYER HAVING TWO OR MORE JOINT PORTIONS IN THE CIRCUMFERENTIAL DIRECTION

BACKGROUND OF THE INVENTION

1. Field of the Invention

The present invention relates to a pneumatic tire for an airplane which is used on an airplane such as a jet passenger airplane or the like.

2. Description of the Related Art

High-speed traveling on runways is required of pneumatic tires for airplanes. Thus, in order to further strengthen the hoop effect of a belt layer, a reinforcing layer which includes a plurality of cords is provided at the outer side of the belt layer in the tire radial direction.

In order to strengthen the hoop effect of the belt layer even more, it is preferable to form the belt layer such that the angle formed by the cords of the reinforcing layer with respect to the tire circumferential direction is substantially 15° or less.

Further, in order to eliminate the cut-ends of the cords of the reinforcing layer, it is preferable to use a reinforcing layer in which the cord direction is substantially the circumferential direction (a so-called spiral structure or jointless structure).

In a reinforcing layer including cords which are set at an angle of 15° or less with respect to the tire circumferential direction, there is usually one or fewer joint portion at which the cords are cut. Namely, the cords of the reinforcing layer are connected over substantially one circumference in the tire circumferential direction.

There have been cases in which, while an airplane is travelling on a runway, the airplane rides over a foreign object such as a metal piece or the like, such that many of the plies of the tire are cut and the tire on occasion bursts.

In a case in which the tire bursts while the airplane is taxiing at low speed, taking-off can be stopped and the tire can be replaced. However, when the airplane cannot stop during taking-off or when pilot does not notice the burst, the airplane takes off and lands on a tire at which a large number of plies are cut and damaged or on a tire which has burst.

There have been cases in which, when an airplane travels at high speed on a tire at which a large number of plies have been cut and damaged or on a tire which has burst in this way, the tire breaks into pieces due to centrifugal force and pieces of the tread scatter about.

In the process in which the tread pieces are formed, a considerable force is needed in order to cut the cords of the reinforcing layer. Thus, it is usually the case that cracks advance along the cords of the reinforcing layer.

Accordingly, in a tire in which the angle formed between the cords of the reinforcing layer and the circumferential direction of the tire is substantially 15° or less and thus the cords are disposed so as to be long along the circumferential direction, the tread pieces which scatter are also long. Here, a problem arises in that such long tread pieces which scatter could cause great damage to the airplane, with the centrifugal force caused by the high speed traveling, although these tread pieces are simply a mass of rubber and cords.

On the other hand, when the angle formed by the cords of the reinforcing layer with respect to the tire circumferential direction is greater than 15°, in a usual pneumatic tire for airplanes, the length of the cords of the reinforcing layer in the circumferential direction is about ⅓ of the circumference of the tire. Accordingly, at the time of separation, if the separation occurs across the entire tread surface without any cutting of the cords of the reinforcing layer, the size of the tread pieces is limited to about ⅓ of the circumference of the tire. However, the hoop effect of the belt layer by such a reinforcing layer (a reinforcing layer in which the angle formed by the cords of the reinforcing layer with respect to the tire circumferential direction is greater than 15°) is poor, which is not preferable.

SUMMARY OF THE INVENTION

In view of the aforementioned facts, an object of the present invention is to provide a pneumatic tire for an airplane which is safer and in which the size of tread pieces which are scattered due to bursting can be reduced such that damage to the airplane can be reduced.

In order to achieve the above object, a first aspect of the present invention is a pneumatic tire for an airplane comprising: a carcass which toroidally straddles a pair of bead cores; a belt disposed at an outer side of the carcass in the tire radial direction; a reinforcing layer disposed at an outer side of the belt in the tire radial direction; and a tread disposed at an outer side of the reinforcing layer in the tire radial direction, wherein the reinforcing layer includes a plurality of cords, the cords being provided such that the longitudinal direction thereof forms an angle of substantially 15° or less with respect to a tire circumferential direction, and the reinforcing layer has two or more joint portions in the tire circumferential direction.

In accordance with the pneumatic tire for an airplane according to the first aspect, the following effects are achieved.

When an airplane travels at high speed on a pneumatic tire for an airplane which has been damaged or has burst due to external damage or the like while travelling, the pneumatic tire for an airplane may be destroyed due to centrifugal force, and the tread pieces may scatter about.

In the process in which the tread pieces are formed, in most cases, separation proceeds between the tread and the reinforcing layer, or between the reinforcing layer and the outermost ply of the belt.

A force of a given level is needed in order to cut the cords of the reinforcing layer. Thus, separation proceeds along the surfaces of the cords of the reinforcing layer where resistance is low, and at the cords end, separation reaches the tread surface and tread pieces are formed.

In the pneumatic tire for an airplane of the present invention, at least two joint portions are provided at the reinforcing layer. Thus, the length of the cords in the circumferential direction of the tire can be shortened, and the size (length) of the tread pieces formed at the time when the tire is damaged can be reduced.

This is particularly effective in cases in which high-strength organic fiber cords, steel cords or the like, which have high cord strength, are used in the reinforcing layer.

In a second aspect of the present invention, in the pneumatic tire for an airplane according to the first aspect, there are three or more joint portions of the reinforcing layer.

In accordance with the pneumatic tire for an airplane according to the second aspect, the following effect is achieved.

By providing three or more joint portions of the reinforcing layer, the size of the tread pieces formed when the tire is damaged can be reduced even more, and damage caused to the airplane can be reduced even more.

In a third aspect of the present invention, in the pneumatic tire for an airplane according to the first or second aspect, there are 24 or fewer joint portions of the reinforcing layer.

In accordance with the pneumatic tire for an airplane according to the third aspect, the following effect is achieved.

When the number of joint portions of the reinforcing layer exceeds 24, a large number of processes is required in order to splice the joints, which is not practical. Further, the hoop effect also deteriorates in this case (because, at the joint portions, offset in the circumferential direction is generated between the adjacent reinforcing layer sections at the time when a large force in the circumferential direction is applied). However, in accordance with the present aspect, because the number of joint potions of the reinforcing layer is kept to 24 or less, the aforementioned disadvantage which arises when the number of joints is overly large can reliably be prevented.

In a fourth aspect of the present invention, in the pneumatic tire for an airplane according to any of the above-described aspects, the distance between joint portions in the circumferential direction of the tire is 10 mm or more.

In accordance with the pneumatic tire for an airplane according to the fourth aspect, the following effect is achieved.

When the distance between joint portions in the circumferential direction of the tire is less than 10 mm, a large number of processes is required in order to splice the joint portions, which is not practical. Further, the hoop effect also deteriorates.

However, in accordance with the present aspect, because the distance between joint portions in the circumferential direction is set to be 10 mm or more, the aforementioned disadvantage, which arises when the distance between joint portions in the circumferential direction is less than 10 mm, can reliably be prevented.

In a fifth aspect of the present invention, in the pneumatic tire for an airplane according to any of the above-described aspects, the distance between joint portions in the circumferential direction of the tire is ⅓ or less of the length of the reinforcing layer in the tire circumferential direction.

In accordance with the pneumatic tire for an airplane according to the fifth aspect, the following effect is achieved.

If the distance between joint portions in the tire circumferential direction is greater than ⅓ of the length of the reinforcing layer in the tire circumferential direction, the tread pieces formed when the tire is damaged are excessively large, and thus, the effect of reducing the damage on the airplane is poor. However, in accordance with the present aspect, the distance between joint portions in the circumferential direction of the tire is kept down to ⅓ or less of the length of the reinforcing layer in the tire circumferential direction. Thus, the aforementioned disadvantage, which arises when the distance between joint portions in the tire circumferential direction is too large, can reliably be prevented.

In a sixth aspect of the present invention, in the pneumatic tire for an airplane according to any of the above-described aspects, the cords of the reinforcing layer extend in zigzags in one direction.

In accordance with the pneumatic tire for an airplane according to the sixth aspect, the following effect is achieved.

When the cords of the reinforcing layer extend in zigzags in one direction, deformation due to internal pressure, load and rotation is easily absorbed. Further, by this deformation, it is possible to apply tension to the cords themselves of the reinforcing layer, and a better hoop effect can be obtained.

In a seventh aspect of the present invention, in the pneumatic tire for an airplane according to any of the above-described aspects, the angle formed by the cords of the reinforcing layer with respect to the tire circumferential direction changes in the widthwise direction of the tire.

In accordance with the pneumatic tire for an airplane according to the seventh aspect, the following effect is achieved.

When the angle formed by the cords of the reinforcing layer with respect to the tire circumferential direction vary in the widthwise direction of the tire, e.g., when the aforementioned angle formed with respect to the tire circumferential direction is small in a vicinity of the tire equatorial plane CL and the angle changes so as to become greater, toward the longitudinal edges of the reinforcing layer, in the widthwise direction of the tire, deformation due to internal pressure, load and rotation is easily absorbed. Further, by this deformation, it is possible to apply tension to the cords themselves of the reinforcing layer, whereby a better hoop effect can be obtained.

BRIEF DESCRIPTION OF THE DRAWINGS

FIG. 1 is a cross-sectional view of a pneumatic tire for an airplane relating to an embodiment of the present invention.

FIG. 2A is a plan view of a reinforcing layer of the pneumatic tire for an airplane relating to the embodiment of the present invention.

FIG. 2B is a plan view of a reinforcing layer of a pneumatic tire for an airplane relating to a conventional example.

FIG. 4A is a plan view of a reinforcing layer of a pneumatic tire for an airplane relating to yet another embodiment of the present invention.

FIG. 4B is a plan view of a reinforcing layer of a pneumatic tire for an airplane relating to still another embodiment of the present invention.

DESCRIPTION OF THE PREFERRED EMBODIMENTS

Figure 3A:
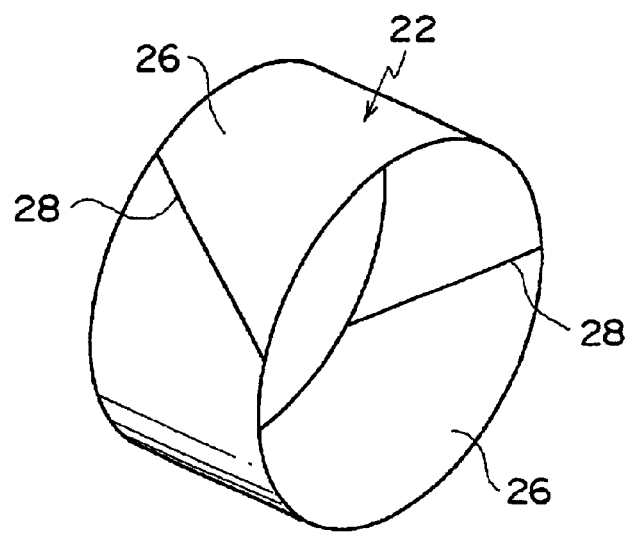
FIG. 3A is a perspective view of the reinforcing layer of the pneumatic tire for an airplane relating to the embodiment of the present invention.

An embodiment of a pneumatic tire for an airplane of the present invention will be described hereinafter with reference to FIGS. 1 through 3.

As shown in FIG. 1, a pneumatic tire 10 for an airplane of the present embodiment (tire size: APR46×17R20 30PR) has, at a bead portion 12, a bead core 14 having a round cross-section. A radial carcass 16, which is formed from seven plies (not shown) in which rubber-covered 1260d/2/2 nylon-66 cords are aligned along the radial direction, is anchored on the bead core 14.

The radial carcass 16 has a so-called up/down structure in which four plies among the seven plies are wound around the bead core 14 from the tire inner side toward the tire outer side, and along the outer side of this wound-around portion of the four plies, the remaining three plies are provided such that these three plies reach the vicinity of the bead.

Other structural members such as flippers, chafers and the like are not illustrated in the figures.

A belt 20 is disposed in a tread 18 and at the outer side, at the crown portion, of the radial carcass 16. The belt 20 is formed by an inner side belt 20A at the side adjacent to the radial carcass 16 and by an outer side belt 20B at the side adjacent to the tread 18.

The inner side belt 20A is formed from four inner side belt plies in which 1260d/2/3 nylon-66 cords are embedded in rubber. The 1260d/2/3 nylon-66 cords intersect a tire equatorial plane CL at an angle A of 10°, and extend substantially along the circumferential direction while zigzagging by being folded over at the both ends of the belt.

The outer side belt 20B is formed from three outer side belt plies in which 1260d/2/2 nylon-66 cords are embedded in rubber. The 1260d/2/2 nylon-66 cords intersect the tire equatorial plane CL at an angle B of 20°, which is greater than angle A, and are cut at both ends of the belt.

(Reinforcing Layer)

A reinforcing layer 22 is provided at the outer side of the outer side belt 20B in the tire radial direction.

As shown in FIG. 2A, the reinforcing layer 22 of the present embodiment is formed from two plies 26 in which a plurality of cords 24, which extend in zigzags along the circumferential direction, are aligned parallel and covered in rubber (the rubber is not illustrated). As shown in FIG. 3A, the reinforcing layer 22 has two joint portions 28 at which the end portions of the two plies 26 in the tire circumferential direction oppose or join each other.

Figure 3B:
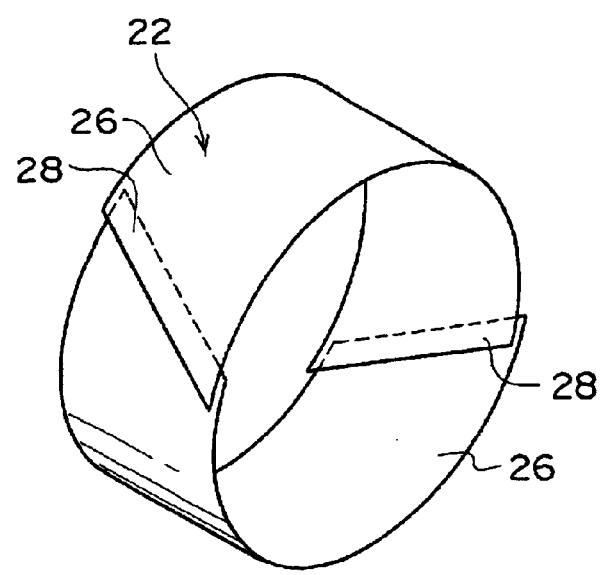
FIG. 3B is a perspective view of a reinforcing layer of a pneumatic tire for an airplane relating to another embodiment of the present invention.

In another embodiment, as shown in FIG. 3B, the joint portions 28 are so-called overlapping joints at which the end portions of the plies 26 in the tire circumferential direction overlap one another.

As shown in FIG. 2A, in a case in which the cords 24 extend in zigzags, the cord angle in the present invention is an angle θ formed by the tire circumferential direction and a central line 24C of the amplitude of the cords 24. In the present embodiment, because the cords 24 extend in zigzags along the circumferential direction, the average angle formed by the cords 24 with respect to the tire equatorial plane CL is 0°.

The material of the cords 24 is not particularly limited, and high-strength organic fiber cords such as Kevlar (trade name, manufactured by DuPont Co.) and ZYLON (trade name, manufactured by Toyo Boseki KK, PBO fibers), steel cords, or the like, which have high cord strength, are preferably used.

(Operation)

Next, the operation of the pneumatic tire 10 for an airplane of the present embodiment will be described.

In a case in which the pneumatic tire 10 for an airplane, which has been damaged or has burst due to external damage or the like during traveling, travels at high speed in that state, the pneumatic tire 10 for an airplane may be destroyed due to centrifugal force, and the tread pieces may scatter about.

In the process in which the tread pieces are formed, in most cases, separation proceeds between the tread 18 and the reinforcing layer 22, or between the reinforcing layer 22 and the outermost layer ply of the belt 20.

Because force of a certain level is required in order to cut the cords 24 of the reinforcing layer 22, separation proceeds along the surfaces of the cords 24 of the reinforcing layer 22 where resistance is low. At the joint portions 28 at which the cords 24 are broken, the separation reaches the tread surface, and the tread pieces are formed.

In the pneumatic tire 10 for an airplane of the present embodiment, two joint portions 28 are provided at the reinforcing layer 22. Thus, the length of the cords 24 of the reinforcing layer 22 in the tire circumferential direction can be made short (½ as compared with the conventional example; refer to FIG. 2B for the reinforcing layer of the conventional example). Further, the size (length) of the tread pieces formed when the tire is damaged can be reduced, and the damage caused to the body of the airplane can be reduced.

In the present embodiment, when the cords 24 of the reinforcing layer 22 extend in zigzags in one direction, deformation due to internal pressure, load, and rotation is easily absorbed, as compared with a case in which cords extend in straight lines. Further, by this deformation, it is possible to apply tension to the cords 24 themselves of the reinforcing layer 22, whereby a better hoop effect can be obtained.

(Other Embodiments)

In the reinforcing layer 22 of the pneumatic tire 10 for an airplane of the above-described embodiment, there are two joint portions 28. However, three or more joint portions 28 may be provided. In this way, the size of the tread pieces which are formed when the tire is damaged can be reduced even more, and damage caused to the airplane can be reduced even more.

Note that the number of joint portions 28 is preferably 24 or less. When the number of joint portions 28 exceeds 24, a large number of processes is required in the work for forming the joints 28, which is not practical. In addition, the hoop effect deteriorates.

Further, the distance between the joint portions 28 in the tire circumferential direction is preferable 10 mm or more. If the distance between any given two of the joint portions 28 in the tire circumferential direction is less than 10 mm, a large number of processes is required in the work for forming the joint portions 28, which is not practical. In addition, the hoop effect deteriorates.

The distance between the joint portions 28 in the tire circumferential direction is preferably ⅓ or less of the length of the reinforcing layer 22 in the tire circumferential direction. If the distance between any given two of the joint portions 28 in the tire circumferential direction is greater than ⅓ of the length of the reinforcing layer 22 in the tire circumferential direction, the tread pieces which are formed when the tire is damaged are excessively large, whereby the effect of reducing damage on the airplane is rather poor.

In the above-described embodiment, the cords 24 of the reinforcing layer 22 extend in zigzags in one direction. However, as illustrated in FIG. 4A, the cords 24 may extend in straight lines in one direction. Or, as shown in FIG. 4B, the cords 24 may be such that the angle thereof with respect to the tire circumferential direction is small in a vicinity of the tire equatorial plane CL, and the angle with respect to the tire circumferential direction changes to become larger as the cord 24 extends, toward the longitudinal edges of the reinforcing layer, in the widthwise direction of the tire.

Note that, in any case, the angle formed by the cord 24 with respect to the circumferential direction at the tire equatorial plane CL is 15° or less.

In the case in which the angle formed by the cord 24 with respect to the circumferential direction varies as shown in FIG. 4B, in the same way as in the above-described embodiment, deformation due to internal pressure, load or rotation can be easily absorbed. Further, by this deformation, it is possible to apply tension to the cords 24 themselves of the reinforcing layer 22, whereby a better hoop effect can be obtained.

Further, the reinforcing layer 22 of the above-described embodiment has a structure in which the plural plies 26 are joined in the tire circumferential direction. However, the present invention is not limited to the same. The reinforcing layer may be a so-called spiral structure in which narrow, belt-shaped plies, which contain one to plural cords, are wound in a spiral while being offset bit-by-bit in the widthwise direction of the tire. A reinforcing layer having such a spiral structure is made to be a structure in which the belt-shaped plies are joined at plural places on the circumference.

EXAMPLES

In order to confirm the effects of the present invention, one Comparative Example tire, and three Example tires to which the present invention was applied were readied, and a drum test was carried out.

Test Tires: The structures, other than the reinforcing layers, of the tires were all the same. The reinforcing layers of the respective test tires were as shown in following Table 1.

Test Method: Under the following conditions, the test tires were set on the drum of a drum tester with a load applied on the tires, and were made to repeatedly travel such that the tires were forcibly broken. The size (length) of the largest tread piece in the tire circumferential direction which scattered was measured.

In each of the test tires, a cut, which was 100 mm in the widthwise direction of the tire and extended to the tire inner surface, was formed in advance in the center portion of the tread.

Tire Flexure: The tires were flexed to 50% of the height of the tire cross-section.

Speed: The tires were accelerated at a constant acceleration from a speed of 0 Km/h to reach, after 70 seconds, a speed of 362 Km/h.

The above conditions are one cycle, and the cycles were repeated until the tire was destroyed.

In the test evaluation, the length of the tread piece which was the largest (longest) at the time when the tire was damaged of the Comparative Example was given an index of 100. The smaller the index, the smaller the size of the tread piece.

TABLE 1

|  | Example 1 | Example 2 | Example 3 | Comparative Example |
|---|---|---|---|---|
| type of cords of reinforcing layer | Kevlar 3330d/3 | ZYLON 3330d/3 | Kevlar 3330d/3 | Kevlar 3330d/3 |
| cord angle of reinforcing layer (on tire equatorial plane) | 0° (zig-zagged cords) | 0° (zig-zagged cords) | 0° (zig-zagged cords) | 20° (zig-zagged cords) |
| number of joint portions (cutting of cords) | 2 | 3 | 18 | 1 |
| joint interval (compared with Comparative Example) | 50 | 33 | 5 (about 20 mm) | 100 |
| size of largest scattered tread piece (compared with Comparative Example) | 45 | 28 | 7 | 100 (entire circumference) |

The tires of Examples 1 through 3 to which the present invention was applied had plural joint portions. Thus, it was confirmed that, in the test in which the tires were forcibly destroyed, the sizes of the tread pieces which scattered could be made small. Further, it was confirmed that, by increasing the number of joints, the size of the tread pieces which scattered could reliably be decreased.

Because the pneumatic tire for an airplane of the present invention has the above-described structure, excellent effects are achieved in that the size of tread pieces which scatter due to bursting can be made small and the damage caused to the airplane can be reduced.

What is claimed is:

1. A pneumatic tire for an airplane comprising:
    a carcass which toroidally straddles a pair of bead cores;
    a belt disposed at an outer side, in the radial direction of the tire, of the carcass;
    a reinforcing layer disposed at an outer side, in the radial direction of the tire, of the belt; and
    a tread disposed at an outer side, in the radial direction of the tire, of the reinforcing layer,
    wherein the reinforcing layer includes a plurality of cords, the cords being provided such that the longitudinal direction thereof forms an angle of substantially 15° or less with respect to a tire circumferential direction and the reinforcing layer has two or more joint portions in the tire circumferential direction, and the reinforcing layer is separatably joined at the joint portions.

2. A pneumatic tire for an airplane according to claim 1, wherein there are three or more joint portions.

3. A pneumatic tire for an airplane according to claim 2, wherein there are 24 or fewer joint portions.

4. A pneumatic tire for an airplane according to claim 1, wherein a distance between joint portions in the tire circumferential direction is 10 mm or more.

5. A pneumatic tire for an airplane according to claim 4, wherein the distance between joint portions in the tire circumferential direction is ⅓ or less of a length of the reinforcing layer in the circumferential direction of the tire.

6. A pneumatic tire for an airplane according to claim 1, wherein the cords of the reinforcing layer extend in zigzags in one direction.

7. A pneumatic tire for an airplane according to claim 6, wherein an average of angles formed by the tire circumferential direction and center lines of amplitudes of the cords extending in zigzags in the one direction is substantially 15° or less.

8. A pneumatic tire for an airplane according to claim 1, wherein an angle formed by the cords of the reinforcing layer with respect to the tire circumferential direction is small in a vicinity of a tire equatorial plane, and changes so as to become greater, toward longitudinal edges of the reinforcing layer, in the widthwise direction of the tire.

9. A pneumatic tire for an airplane according to claim 1, wherein the joint portions of the reinforcing layer are formed by making, end portions of the reinforcing layer in the circumferential direction of the tire, oppose one another.

10. A pneumatic tire for an airplane according to claim 1, wherein the joint portions of the reinforcing layer are overlapping joints formed by making, end portions of the reinforcing layer in the circumferential direction of the tire, overlap one another.

\* \* \* \* \*